Dec. 28, 1926.
C. H. WHITE
1,612,165
TANDEM DISK HARROW
Filed July 5, 1924
3 Sheets-Sheet 1
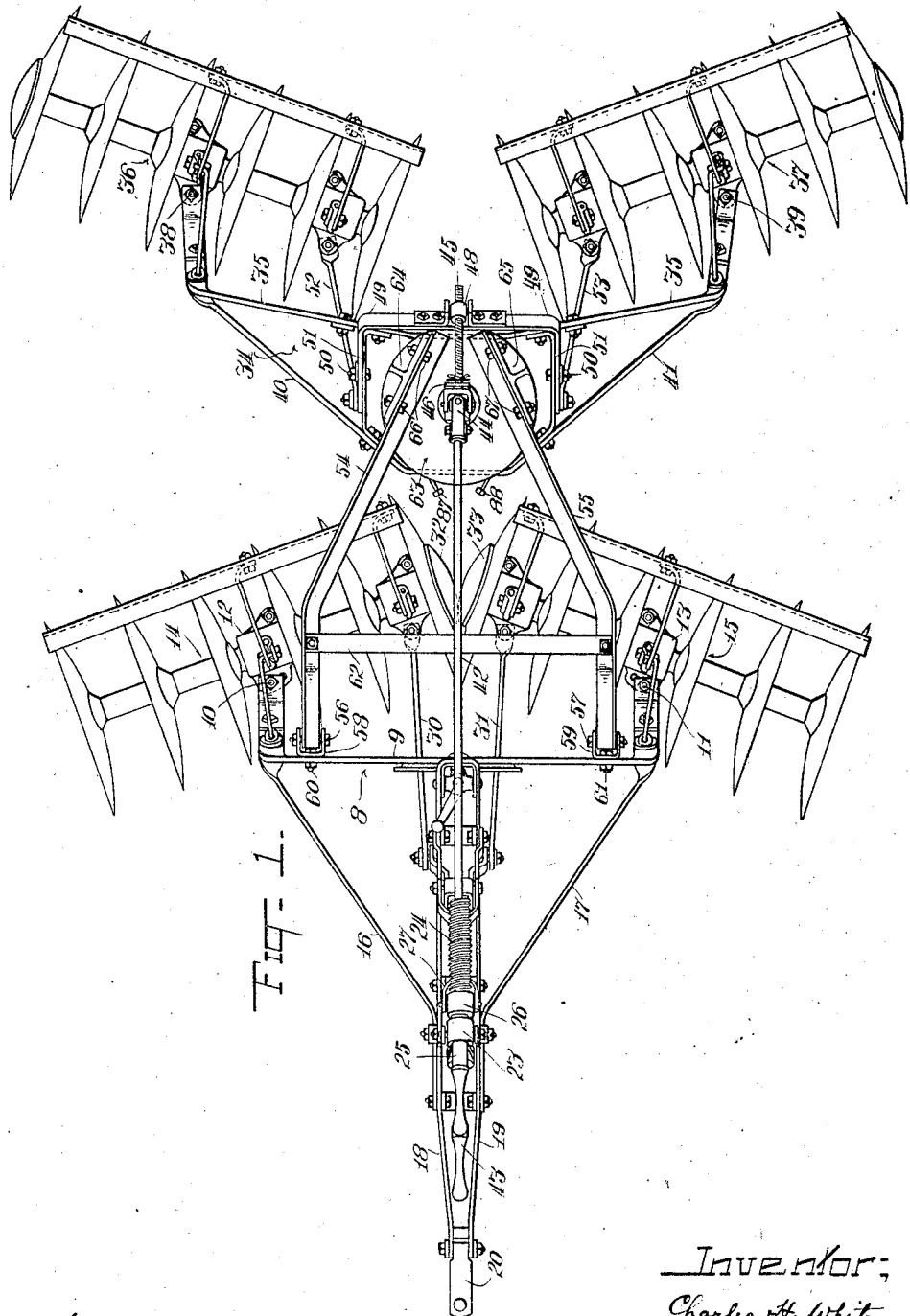
Witness;
E. Wilderson
Inventor;
Charles H. White,
By John L. Jackson,
Attorney.

Dec. 28, 1926.
C. H. WHITE
1,612,165
TANDEM DISK HARROW
Filed July 5, 1924
3 Sheets-Sheet 2
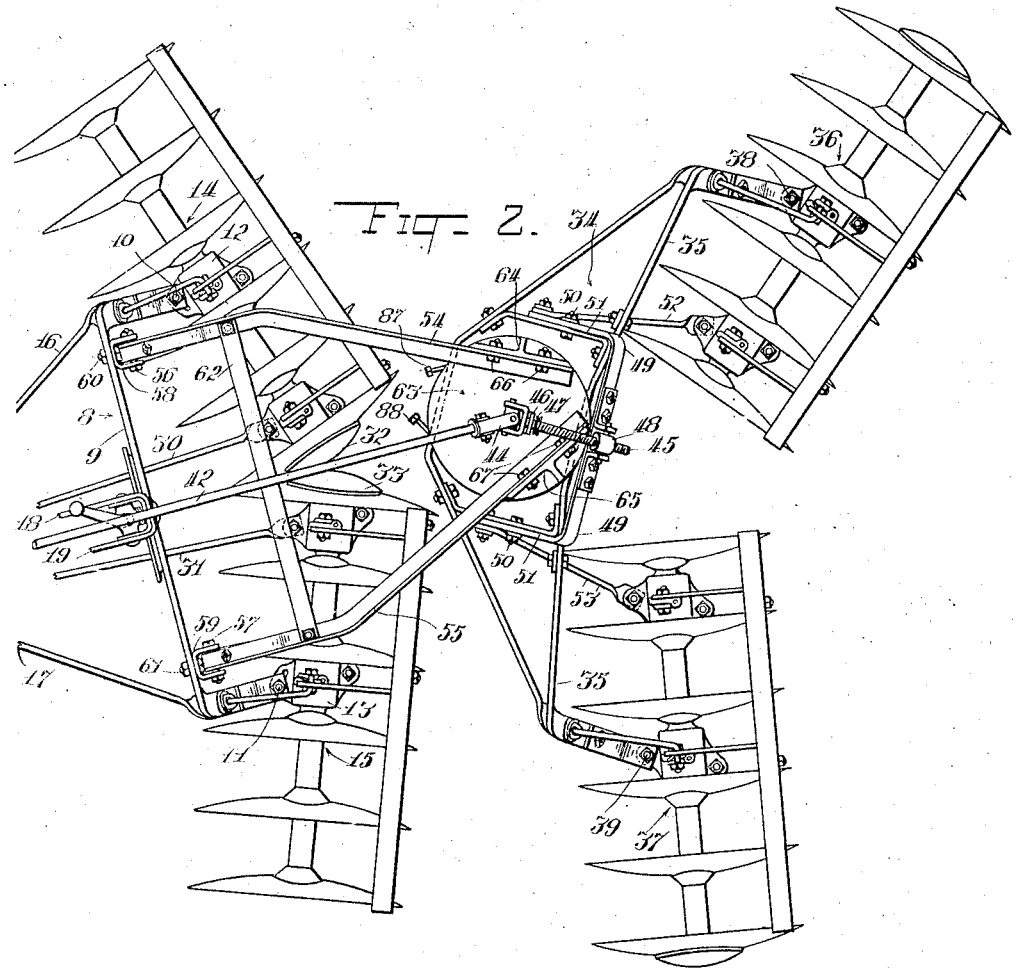
Witness;
E. Wilderen
Inventor;
Charles H. White,
By John L. Jackson,
Attorney Dec. 28, 1926.
C. H. WHITE
1,612,165
TANDEM DISK HARROW
Filed July 5, 1924
3 Sheets-Sheet 3
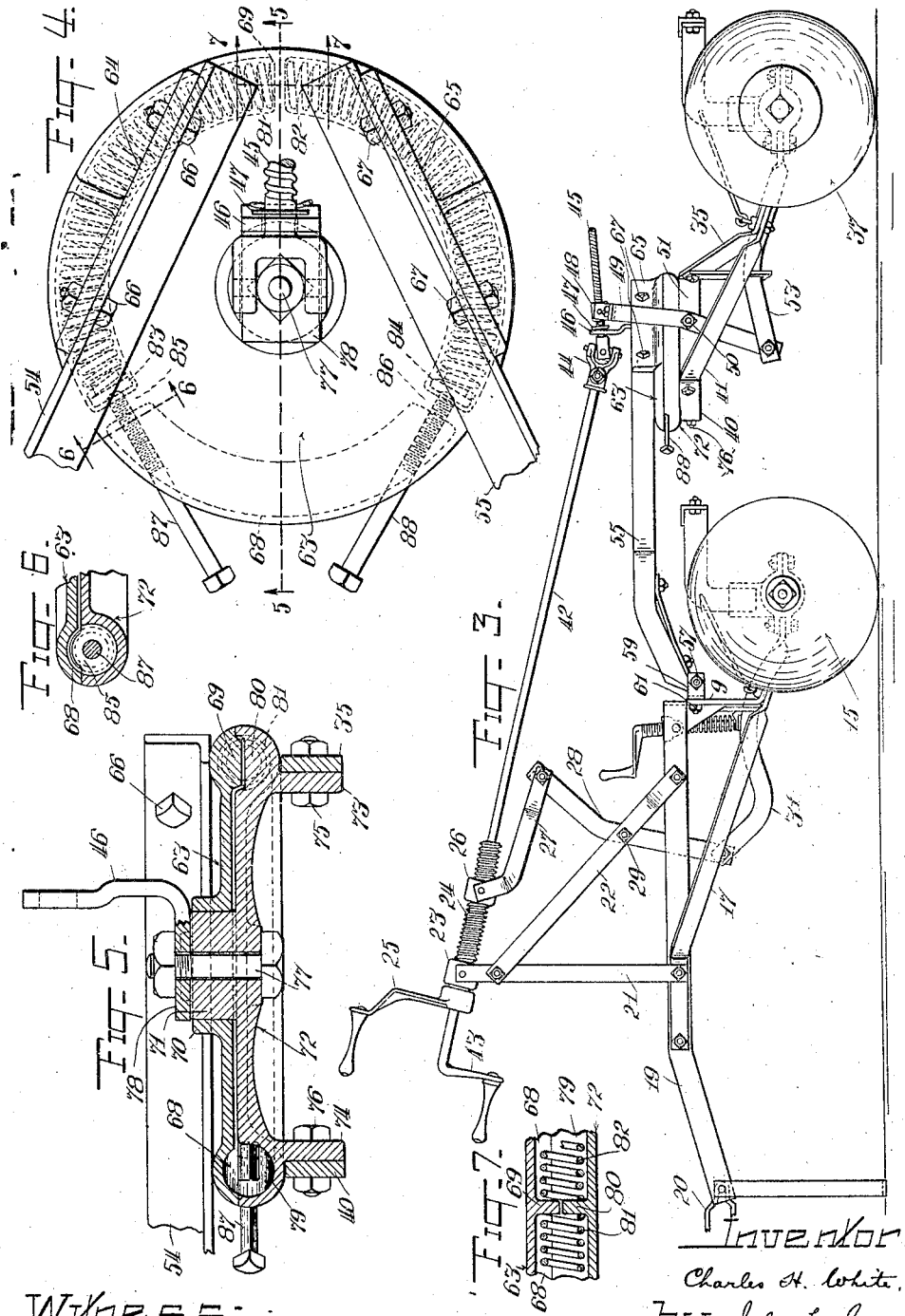

Patented Dec. 28, 1926.

1,612,165

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

TANDEM DISK HARROW.

Application filed July 5, 1924. Serial No. 724,532.

My invention relates to disk harrows of the tandem type in which front and rear harrow units or sections, each comprising a pair of the usual disk gangs, are pivotally or otherwise flexibly connected together so that the units may be angled relatively to each other. In harrows of this type corresponding front and rear disk gangs are usually arranged so that the disks of the rear gang cut the soil left between the disks of the front gang, and it is important that this relation of the disks of the front and rear gangs be maintained not only when the harrow is proceeding straight ahead, but also when it is rounding curves or being turned to avoid obstacles. This relation of the disks of the front and rear gangs is herein referred to as "registration". It is also important that the draft connections by which the rear unit is drawn through the front unit be such as to hold the rear unit steady and prevent it from oscillating too freely, and also that means be provided by which the normal or straight-away relation of the units to each other will be restored quickly when a straight-away course is resumed after a turning movement. The tendency of the rear unit to oscillate easily, because of unequal resistance encountered by the disks of the opposite rear gangs, is herein termed "nervousness". To provide an improved disk harrow in which registration will always be maintained and nervousness will be avoided, so that the disks of the rear gangs will always maintain their proper relation to the disks of the corresponding front gangs and the tendency of nervous harrows to side slip or drift on side hill work will be avoided, is the object of my present invention. This object I accomplish as illustrated in the drawings and as hereinafter described. What I regard as new is set forth in the claims.

In the accompanying drawings, in which I have illustrated my improvements as applied to a tandem disk harrow of a commercially well-known design,—

Fig. 1 is a plan view showing the parts of the harrow in their normal position, or the position assumed by the front and rear units for straight-away work;

Fig. 2 is also a plan view showing the parts in the position they assume when a turn to the left is being made;

Fig. 3 is a side elevation showing the disk gangs in transport position, at which time the gangs of each unit are alined;

Fig. 4 is an enlarged detail, being a plan view of parts of the draft connections in which my improvements are more particularly included;

Fig. 5 is a vertical section on line 5—5 of Fig. 4;

Fig. 6 is a detail, being a cross-section on line 6—6 of Fig. 4; and

Fig. 7 is also a detail, being a partial vertical cross-section on line 7—7 of Fig. 4.

The harrow to which in the illustrated construction I have applied my improvements is composed of the usual front and rear units or sections flexibly coupled together so that they may be angled relatively to each other, and the harrow as a whole is designed to be drawn either by a tractor or by a team, as may be preferred. The disk gangs of each unit may be angled relatively to each other and secured in fixed relation to each other. In the drawings I have shown means for conveniently making these adjustments, and although many of the details of the construction shown have nothing to do with my present invention, they will be described briefly.

As shown in Fig. 1, the front unit comprises a front frame, designated as a whole by the reference numeral 8, said frame being made up in part of a transverse bar or beam 9, the end portions of which are bent backward and downward and are pivotally and adjustably connected by pivots 10, 11 with brackets 12, 13 carried respectively by disk gangs 14, 15. The end portions of the beam 9 are connected to forwardly converging side bars 16, 17, which are in turn connected to draft bars 18, 19 provided at their forward ends with a clevis 20 for attachment thereto of the source of draft power. The bars 18, 19 are suitably connected together to form a frame, and rising from them are standards 21 braced by braces 22, as shown in Fig. 3. Between the upper ends of the standards 21 is pivotally mounted an internally threaded collar 23 in which works a tubular externally screw-threaded shaft 24 adapted to be rotated to move it longitudinally of the harrow. A crank 25 on the forward end of the shaft 24 provides means for rotating it. Carried by the shaft 24 is a collar 26 pivotally connected with the forward ends of links 27, the rear ends of which are connected to rocking levers 28 fulcrumed at 29 on the braces 22, and connected at their lower ends by links 30, 31 with the inner ends of the disk gangs 14, 15, respectively. The arrangement is such that by rotating the shaft 24 the links 30, 31 may be moved forward or backward, thereby angularly adjusting the gangs 14, 15 relatively to each other. When adjusted the gangs are held in fixed relation to each other by the threaded shaft 24, as shown in Fig. 1. The inner ends of said gangs are provided with convex bearing plates 32, 33 which abut against each other and serve as thrust bearings between said gangs.

The rear unit comprises a frame, designated as a whole by the reference numeral 34, said frame being composed in part of a transverse beam 35 similar to the beam 9, and similarly connected to rear disk gangs 36, 37 by pivots 38, 39, respectively. The end portions of the beam 35 are connected to forwardly converging side bars 40, 41, which are preferably integrally connected together at their forward ends, as best shown in Fig. 1. For angularly adjusting the rear gangs relatively to each other I provide a rod or shaft 42 which extends through the tubular shaft 24, in which it is movable longitudinally, and is provided at its front end with a crank 43, as shown in Fig. 3. At its rear end the rod 42 is connected by a universal coupling 44 with the forward end of a screw-threaded shaft 45 mounted in a bracket 46, through a hole in which it extends. The shaft 45 is held against longitudinal movement by the coupling 44 and a collar 47 secured to said shaft at the opposite side of the bracket 46 from the coupling 44, best shown in Fig. 3. The shaft 45 works through a screw-threaded collar 48 pivotally mounted at the upper end of a swinging lever 49 fulcrumed at 50 on a supplemental frame 51 which is connected between the members 35, 40 and 41, as best shown in Fig. 1. It will be noted that the lever 49 is bifurcated, its lower ends extending down at opposite sides of the frame 51 and being connected by links 52, 53 with the inner end portions of the gangs 36, 37, respectively. Obviously, by rocking the lever 49 the inner ends of said gangs may be moved back and forth, thereby changing their angular relation to each other, and they are held in fixed relation to each other, when adjusted, by the screw shaft 45.

Coming now to the draft connections between the front and rear units, 54, 55 indicate the side members of a draft frame, the front ends of which are pivotally connected with the beam 9 by horizontal transversely disposed pivots 56, 57 mounted in yokes 58, 59 that are pivotally connected by fore and aft bolts 60, 61 with the beam 9, as shown in Fig. 1. These connections are loose enough so that the draft frame is not only capable of swinging vertically, but also may rock to some extent about a longitudinal axis to permit the disk gangs to accommodate themselves to inequalities in the ground. The yokes 58, 59 are at opposite sides of the median line of the harrow and equi-distant therefrom, and, as shown in Figs. 1 and 2, the side members 54, 55 converge rearwardly. Near their forward ends they are connected by a cross-bar 62, best shown in Fig. 1, and at their rear ends they are fixedly connected to a draft member in the form of a circular plate or disk 63, preferably by means of brackets 64, 65 secured thereto by bolts 66, 67. These brackets are preferably cast integral with the disk 63 and rise from the upper surface thereof at opposite sides of the median line thereof. At its under side the disk 63 is provided with an annular groove 68 near its periphery, said groove in the construction illustrated being approximately semi-cylindrical in form, and at the rear it is divided by a downwardly projecting lug or abutment 69 which lies in the median line of the front harrow section, as shown in Figs. 4 and 5.

As best shown in Fig. 5, said disk is provided with a concentric flange 70 surrounding a central opening, which flange is adapted to fit over and bear upon the hub 71 of an underlying disk 72 which is fixedly secured to the rear harrow section, preferably by means of depending flanges 73, 74 that fit against and are secured to the beam 35 and side bars 40, 41 by bolts 75, 76. The two disks 63 and 72 are pivotally secured together by means of a pivot bolt 77 and the lower portion of the bracket 46 which, as shown at 78 in Figs. 4 and 5, is bent so that it extends horizontally over the hub 71 and, as shown in Fig. 4, overlaps the flange 70. Thus the two disks 63, 72 form a sort of turntable by which the front and rear units are pivotally connected together so that they may swing laterally relatively to each other. The lower disk, 72, is provided in its upper surface near its margin with an annular groove 79 which registers with the groove 68, so that the two grooves together form a cylindrical pocket between said disks. At a point in the median line of the rear unit the groove 79 is divided by an upwardly extending lug or abutment 80 which, when the harrow units are in their normal position, registers with the abutment 69, as shown in Fig. 7. Thus the groove 79 is divided at the rear into two pockets, and in these pockets are placed springs 81, 82, the rear ends of which bear against opposite surfaces of the abutments 69, 80, as shown in said figure. The forward ends of said springs bear against bearing plates 83, 84, respectively, which lie in the groove 79 adjacent to abutments 85, 86 carried by the disk 72, as shown in dotted lines in Fig. 4 and in full lines in Fig. 6. Adjusting screws 87, 88 are fitted in threaded bearings in the abutments 85, 86, their rear ends extending therethrough into engagement with the plates 83, 84. By this arrangement by adjusting the screws 87, 88 the normal tension of the springs 81, 82 may be adjusted by lengthening or shortening the distance between the bearing plates 83, 84, respectively, and the abutments 69, 80.

When the harrow units are in their normal position shown in Fig. 1, at which time, as has been explained, the abutments 69, 80 are in registering position and lie in the median line of the harrow, the tension of the springs 81, 82 is the same, and they neutralize each other. If, however, the rear unit should swing laterally, or the front unit should be turned laterally in steering the harrow, one or the other of said springs will be put under greater tension, since then the disks 63, 72 are rotated relatively to each other, thereby moving the abutments 69, 80 out of alinement, and consequently compressing one or the other of said springs. For example, if the front unit be turned to the left, as illustrated in Fig. 2, the upper disk, 63, will be turned counter-clockwise relatively to the lower disk, 72, thereby moving the abutment 69 to the left as viewed in Fig. 7 and compressing the spring 81 between it and the bearing plate 83. It will be apparent, therefore, that the spring 81 tends to resist this turning movement, and that the increased tension caused by the turning movement tends to restore the harrow units to their normal position. A similar operation takes place if the rear unit swings laterally in the direction illustrated in Fig. 2, as then the lower disk 72 swings clockwise as viewed in Fig. 2, moving the bearing plate 83 in the same direction and compressing the spring 81 between it and the abutment 69. If the deflection is in the opposite direction, the spring 82 is compressed and operates in the same manner as that described for the spring 81. It will be seen, therefore, that the two springs cooperate to resist movement of the rear unit independently of the front unit in either direction away from its normal position, and consequently the harrow is stable, or not nervous, and the tendency of the rear gangs to side slip or drift on side hill work is materially reduced, if not entirely overcome.

The draft connections are so designed that the pivot 77 is substantially midway between the transverse axes of the front and rear units, and lies in the median line of the harrow when the units are in their normal position, or at the point of intersection of the median lines of the units when they are angled. The disks of the front and rear gangs therefore follow concentric arcs during turning movements, and as the springs tend to restore the units to and hold them in their normal position registration is well maintained.

So far as I am aware, I am the first in the art to provide a tandem disk harrow with oppositely acting spring-actuated devices which tend to hold the harrow units in normal relation to each other, and I wish it to be understood that my invention is not restricted to the construction illustrated and described, but includes such modifications thereof embodying the generic feature of utilizing oppositely acting spring-actuated stabilizing devices as would occur to those skilled in the art.

What I claim as my invention and desire to secure by Letters Patent, is—

1. In a tandem disk harrow, the combination of front and rear units, and draft connections between said units arranged to permit angling thereof laterally relatively to each other about an axis lying substantially midway between the transverse axes of said units, comprising spring-actuated devices tending to hold said units in normal relation to each other.

2. In a tandem disk harrow, the combination of front and rear units, draft connections between said units arranged to permit angling thereof laterally relatively to each other about an axis lying substantially midway between the transverse axes of said units, comprising spring-actuated devices tending to hold said units in normal relation to each other, and means controlled by the turning of one of said units laterally for increasing the spring power applied to said devices effective to restore said units to their normal relation to each other.

3. In a tandem disk harrow, the combination of front and rear units, draft connections between said units arranged to permit angling thereof relatively to each other, and oppositely acting springs tending to hold said units in normal relation to each other.

4. In a tandem disk harrow, the combination of front and rear units, draft connections between said units arranged to permit angling thereof relatively to each other, springs associated with said draft connections, and means actuated by angling of said units in one direction to increase the tension of one of said springs, and actuated by angling of said units in the opposite direction to increase the tension of the other spring.

5. In a tandem disk harrow, the combination of front and rear units, means pivotally connecting said units together to swing angularly relatively to each other, and oppositely acting springs tending to hold said units in normal relation to each other.

6. In a tandem disk harrow, the combination of front and rear units, means pivotally connecting said units together to swing angularly relatively to each other, oppositely acting springs tending to hold said units in normal relation to each other, and means actuated by angling of said units in one direction to increase the tension of one of said springs, and actuated by angling of said units in the opposite direction to increase the tension of the other spring.

7. In a tandem disk harrow, the combination of front and rear units pivotally connected together to swing laterally draft members connected with said units respectively and rotatable relatively to each other by the angling of said units, and oppositely acting springs associated with and tending to hold said draft members against relative rotation.

8. In a tandem disk harrow, the combination of front and rear units, draft members connected with said units respectively and rotatable relatively to each other by the angling of said units, means pivotally connecting said draft members together, and oppositely acting circumferentially disposed springs associated with and tending to hold said draft members against relative rotation.

9. In a tandem disk harrow, the combination of front and rear units, draft members connected with said units respectively and rotatable relatively to each other by the angling of said units, means pivotally connecting said draft members together, oppositely acting circumferentially disposed springs associated with and tending to hold said draft members against relative rotation, and means for adjusting the tension of said springs.

10. In a tandem disk harrow, the combination of front and rear units, draft members connected with said units respectively and rotatable relatively to each other by the angling of said units, means pivotally connecting said draft members together, registering abutments carried by said draft members positioned in the median line of the harrow when the units are in normal position, plates carried by one of said draft members at opposite sides thereof, and springs interposed between said plates and said abutments whereby angling of said units in either direction will increase the tension of one or the other of said springs.

11. In a tandem disk harrow, the combination of front and rear units, draft members connected with said units respectively and rotatable relatively to each other by the angling of said units, means pivotally connecting said draft members together, registering abutments carried by said draft members positioned in the median line of the harrow when the units are in normal position, plates carried by one of said draft members at opposite sides thereof, spring interposed between said plates and said abutments whereby angling of said units in either direction will increase the tension of one or the other of said springs, and means for adjusting the position of said plates.

12. In a tandem disk harrow, the combination of front and rear units, a frame extending rearwardly from the front unit and pivoted to swing vertically, a draft member rigidly connected with said frame, a frame connected with the rear unit and extending forward therefrom, a draft member rigidly connected with the latter frame, means pivotally connecting said draft members together so that they may rotate relatively to each other when said units are angled, and oppositely acting springs associated with and tending to hold said draft members against relative rotation.

13. In a tandem disk harrow, the combination of front and rear units, a frame extending rearwardly from the front unit and pivoted to swing vertically, a draft member rigidly connected with said frame, a frame connected with the rear unit and extending forward therefrom, a draft member rigidly connected with the latter frame, means pivotally connecting said draft members together so that they may rotate relatively to each other when said units are angled, springs interposed between said draft members at opposite sides of the median line of the harrow, and devices carried by said draft members for increasing the tension of one or the other of said springs when said units are angled in one direction or the other.

14. In a tandem disk harrow, the combination of front and rear units, a frame extending rearwardly from the front unit and pivoted to swing vertically, a draft member rigidly connected with said frame, a frame connected with the rear unit and extending forward therefrom, a draft member rigidly connected with the latter frame, means pivotally connecting said draft members together so that they may rotate relatively to each other when said units are angled, springs interposed between and enclosed by said draft members at opposite sides of the median line of the harrow, and devices carried by said draft members for increasing the tension of one or the other of said springs when said units are angled in one direction or the other.

15. In a tandem disk harrow, the combination of front and rear units, a frame extending rearwardly from the front unit and pivoted to swing vertically, a draft member rigidly connected with said frame, a frame connected with the rear unit and extending forward therefrom, a draft member rigidly connected with the latter frame, means pivotally connecting said draft members together so that they may rotate relatively to each other when said units are angled, springs interposed between and enclosed by said draft members at opposite sides of the median line of the harrow, devices carried by said draft members for increasing the tension of one or the other of said springs when said units are angled in one direction or the other, and means for adjusting the normal tension of said springs.

CHARLES H. WHITE.